United States Patent [19]

Kanao

[11] 4,136,829
[45] Jan. 30, 1979

[54] NEEDLE NOZZLE HAVING A VALVE

[76] Inventor: Mitsuhiro Kanao, 2156-14 Yakeyama-Cho, Kure-shi, Hiroshima-ken, Japan

[21] Appl. No.: 774,168

[22] Filed: Mar. 3, 1977

[30] Foreign Application Priority Data

Mar. 4, 1976 [JP] Japan .................................. 51-23892

[51] Int. Cl.² .............................................. B05B 1/30
[52] U.S. Cl. .................................................. 239/533.1
[58] Field of Search ............... 239/533.1, 533.2, 533.3, 239/533.4, 533.5, 533.6, 533.7, 533.8, 533.9, 533.11, 533.12, 533.13; 425/DIG. 224, DIG. 225, DIG. 226, DIG. 220, 245 NS

[56] References Cited

U.S. PATENT DOCUMENTS

| 1,891,340 | 12/1932 | Ammirandoli et al. | 267/34 |
| 3,295,169 | 1/1967 | Moslo | 239/533.15 |
| 4,010,903 | 3/1977 | Sakuri et al. | 239/533.1 |

*Primary Examiner*—James B. Marbert
*Attorney, Agent, or Firm*—William Anthony Drucker

[57] ABSTRACT

An injection nozzle for injection moulding purposes has a nozzle body with a feed passage opening which is normally closed by a needle valve. The injected resin, under high pressure, forces the needle valve to retract and open the nozzle. The improvement is a piston on the needle valve acted on by spring means to urge the needle valve to closed position, the needle valve having a valve element which, when the needle valve is fully opened, seals off the cylinder in which the piston moves, thereby to prevent entry of injection material into the cylinder. The cylinder may optionally have a charge of gas under high pressure in it, or a material which produces such a charge under the operating conditions of the nozzle.

3 Claims, 2 Drawing Figures

NEEDLE NOZZLE HAVING A VALVE

BACKGROUND OF THE INVENTION

It is known to be convenient, for use in the injection of resins, to utilize an injection nozzle having a needle valve adapted to be retracted by the pressure of the resin to open the nozzle as the injection is commenced, the pressure being applied to a tapered portion of the needle, the needle being further adapted to be returned by spring force, when the injection is completed, e.g. to close the nozzle by a force exerted by a piston spring, associated with a piston, provided on the periphery of the nozzle.

This type of injection nozzle has been found, however, to be inconvenient in some aspects in that its piston relies entirely upon a pressure differential between the pressure of the resin and the ambient atmospheric pressure. Thus, the piston receive the ambient atmospheric pressure directly on one face, and is also subjected to the high temperature of the resin which may be 150 to 350° C., and with repeated application of a pressure between 0 and 120 Kg/cm$^2$. Accordingly, a leakage of resin tends to occur around the piston, no matter how carefully and precisely the piston may be machined. This tendency to leak cannot be avoided, even by the provision of piston rings. Once the leakage takes place, the resin tend to gum up the parts adjacent to the nozzle, e.g. a nozzle heater, electric wires for the heater and a locator ring, and becomes accummulated thereon. Considerable time and labor are required to remove such accumulations of resin. For these reasons, injection nozzles having a piston relying upon the pressure differential between the resin and atmospheric pressure are not used very widely.

Another conventional injection nozzle called the "slide head type" has been found also inconvenient in that it requires the continuous operation of an injection bed, while still another conventional nozzle called the "shut-off type" disadvantageously necessitates a complicated structure for actuating a hydraulic piston for effecting the opening and closing of the nozzle. Both the "slide head type" and the "shut-off type" have a common drawback of leakage of resin, attributable to a direct contact of the piston with the atmosphere.

To overcome these drawbacks, there has recently been proposed a needle valve making use of a pressure differential of the resin and relying upon Pascal's law. However, the leakage of resin of the spring section can never be acceptably reduced even in this type of injection nozzle.

OBJECT OF THE INVENTION

Under these circumstances the object of the present invention is to provide an improved needle-type injection nozzle having no part associated with atmospheric pressure, so as to eliminate leakage of the resin.

SUMMARY OF THE INVENTION

According to the invention, there is provided a needle-type injection nozzle having a chamber housing a piston and a spring for biassing the piston, the piston having a valve element for preventing resin from entering the chamber.

An embodiment of the invention is described hereinafter with reference to the accompanying drawing.

DESCRIPTION OF THE PREFERRED EMBODIMENT

Figure 1:
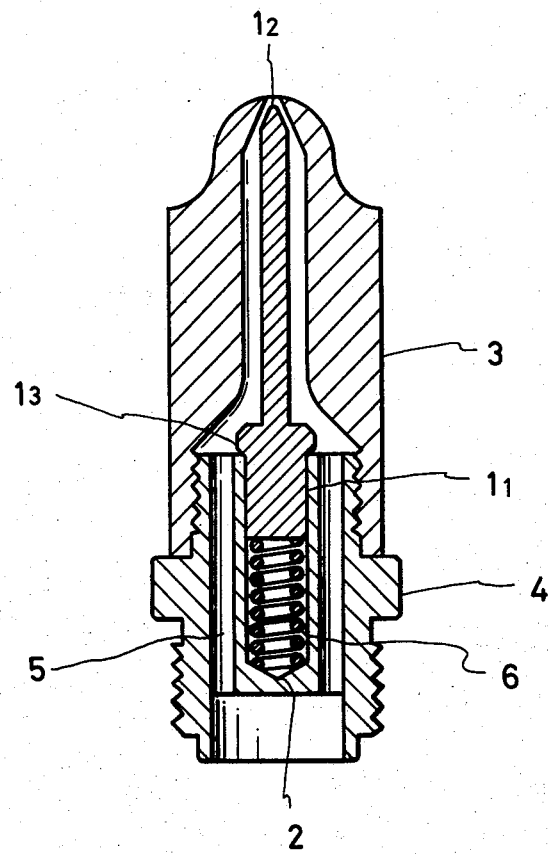
FIG. 1 is an axial section of an injection nozzle.
Figure 2:
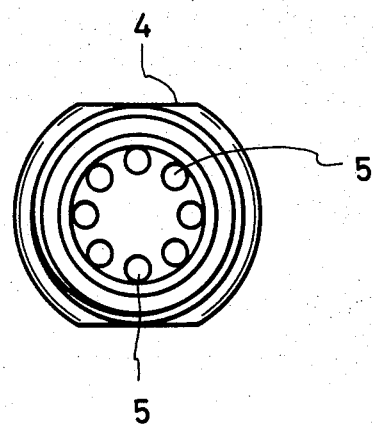
FIG. 2 is an underplan view thereof.

Referring to FIG. 1, showing an embodiment of the invention, resin under high pressure is applied to a tapered portion $1_2$ of a needle-valve element and to a leak-preventing valve element $1_3$ on a piston $1_1$, so that the needle is moved to the opened position i.e. is retracted, as the injection is commenced. The injection pressure, which may reach 40 to 120 kg/cm$^2$, acts on the leak-stopping valve element $1_3$ to prevent the resin from getting behind the valve element $1_3$ and into the region of the piston and cylinder.

The cavity behind the nozzle is loaded with new resin during a cooling period subsequent to the injection. Since a sprue is formed during the filling of the mold cavity with the resin, there is no dalling. The end of the injection nozzle then opens as the sprue is removed. Since the needle valve is kept in closed condition, pyrolysis of the resin causes a pressure which occurs within the cavity behind the nozzle opening. This pressure is typically 0 to 10 kg/cm$^2$ depending on the kind of resin, which may be a foaming resin. This pressure is applied to the small gap, between the piston and the wall of the chamber housing the piston, through the leak-stopping valve which is then kept opened. Although a slight amount of resin may be forced to pass behind the piston, the resin is decomposed to create a balance or equilibrium of pressure across the piston. At the same time, a pankin characteristic caused by the viscosity of the resin is sufficient to prevent entry of the resin into the spring chamber, when the pressure of the resin is as low as 10 kg/cm$^2$. For these reasons no substantial problem is caused by the filling of the spring chamber with resin.

The spring chamber is preferably filled with a substance which creates a high pressure, so that the resultant pressure may play the double role of stopping the entry of the resin and of exerting a supplementary pressure assisting the spring. The substance must be inert to the resin, and may be water or polyethylene, and is preferably in the form of pellets.

It will be understood from the foregoing description that the needle-type injection nozzle of the invention, having a much simplified construction and a reduced size, is suitable for use in an injection molding machine, and greatly contributes to save labor in injection molding, due to its inexpensive and troublefree nature.

I claim:

1. In an injection nozzle, for injection moulding of synthetic resinous plastics, having:
   (a) a nozzle body including a feed passage leading to an outlet opening, said nozzle body defining at said opening a first valve seating, said nozzle body including a cylinder chamber having first and second ends,
   (b) a needle valve member movable in said feed passage and including a first valve element shaped to coact with said first valve seating, said needle valve member including a piston slidable in said cylinder chamber,
   (c) spring loading means positioned in said cylinder chamber and abutting the piston to urge the needle valve member in the direction to close said first valve element and valve seating, the improvement that:

(i) said nozzle body defines a second valve seating at said first end of said cylinder, and
(ii) said needle valve member includes a second valve element shaped to coact with said second valve seating, and movement of said needle valve member in said direction opens said second valve element and seating, and
(iii) said second end of said cylinder chamber is closed to said feed passage of the nozzle body, whereby application of plastics material to said feed passage under pressure during injection moulding causes movement of the needle valve member in the reverse direction to open said first valve element and valve seating, and to close said second valve onto said second valve seating, thereby to seal said cylinder chamber against entry of plastics material.

2. An injection nozzle, as claimed in claim 1, having a filling of gas under high pressure in said cylinder chamber to act on said piston and urge said needle valve in the same direction as the spring-loading means.

3. An injection nozzle, as claimed in claim 1, having in said cylinder chamber a material which, under operating conditions of the nozzle, produces in said cylinder chamber a charge of gas under high pressure acting on said piston to urge said needle valve in the same direction as the spring-loading means.